United States Patent
Chung

(10) Patent No.: US 9,132,861 B2
(45) Date of Patent: Sep. 15, 2015

(54) VEHICLE BODY REINFORCING STRUCTURE

(71) Applicant: Hyundai Motor Company, Seoul (KR)

(72) Inventor: Hee Seouk Chung, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/296,262

(22) Filed: Jun. 4, 2014

(65) Prior Publication Data

US 2015/0166112 A1    Jun. 18, 2015

(30) Foreign Application Priority Data

Dec. 16, 2013    (KR) .................... 10-2013-0156680

(51) Int. Cl.
  *B60J 7/00*    (2006.01)
  *B62D 25/08*    (2006.01)

(52) U.S. Cl.
  CPC ..................... *B62D 25/08* (2013.01)

(58) Field of Classification Search
  CPC .... B62D 25/04; B62D 21/152; B62D 21/157; B62D 25/02; B60G 2204/128; C08L 67/06; C08K 3/22; B60C 13/00; B60C 9/26; Y10T 152/10765
  USPC ............. 296/193.06, 187.03, 187.09, 193.02, 296/198, 203.01, 203.02, 204
  See application file for complete search history.

(56) References Cited

U.S. PATENT DOCUMENTS

| | | | | |
|---|---|---|---|---|
| 4,078,840 A | * | 3/1978 | Itoh | 296/192 |
| 4,717,198 A | * | 1/1988 | Komatsu | 296/192 |
| 4,986,597 A | * | 1/1991 | Clausen | 296/205 |
| 5,061,009 A | * | 10/1991 | Harasaki et al. | 296/192 |
| 5,586,799 A | * | 12/1996 | Kanemitsu et al. | 296/203.02 |
| 5,653,495 A | * | 8/1997 | Bovellan et al. | 296/203.03 |
| 2002/0063445 A1 | * | 5/2002 | Takeuchi | 296/204 |
| 2006/0000145 A1 | * | 1/2006 | Yoshida et al. | 49/360 |
| 2006/0152027 A1 | * | 7/2006 | Stojkovic et al. | 296/29 |
| 2007/0215402 A1 | * | 9/2007 | Sasaki et al. | 180/232 |
| 2007/0252412 A1 | * | 11/2007 | Yatsuda | 296/193.09 |
| 2008/0224502 A1 | * | 9/2008 | Miki | 296/203.02 |
| 2009/0146455 A1 | * | 6/2009 | Honji et al. | 296/187.09 |
| 2009/0195019 A1 | * | 8/2009 | Yamada et al. | 296/187.01 |
| 2010/0026051 A1 | * | 2/2010 | Tamakoshi | 296/203.02 |

(Continued)

FOREIGN PATENT DOCUMENTS

JP    2008-222039 (A)    9/2008
JP    2013-159290 (A)    8/2013

*Primary Examiner* — Kiran B Patel

(74) *Attorney, Agent, or Firm* — Morgan, Lewis & Bockius LLP

(57) ABSTRACT

Disclosed is a vehicle body reinforcing structure. The vehicle body reinforcing structure includes: a front pillar which is formed to be extended upward and downward in a height direction of a vehicle; a side inner reinforcing member which is formed to be extended in a length direction of the vehicle; a floor compliance; a first reinforcing member which is coupled to a lower portion of the front pillar in the height direction of the vehicle, and has one end that is coupled to the side inner reinforcing member; and a second reinforcing member which is integrally coupled to the other end of the first reinforcing member, and has one end that is coupled to the floor compliance, and the other end that is coupled to the side inner reinforcing member, thereby improving performance for coping with a frontal collision and a broadside collision of the vehicle.

13 Claims, 10 Drawing Sheets

(56) References Cited

U.S. PATENT DOCUMENTS

| | | | |
|---|---|---|---|
| 2010/0295336 A1* | 11/2010 | Itakura | 296/193.06 |
| 2013/0161981 A1* | 6/2013 | Mildner | 296/203.02 |
| 2014/0175825 A1* | 6/2014 | Shimanaka | 296/39.3 |
| 2014/0300135 A1* | 10/2014 | Roehrl et al. | 296/187.09 |

* cited by examiner

VEHICLE BODY REINFORCING STRUCTURE

CROSS-REFERENCE TO RELATED APPLICATION

The present application claims priority of Korean Patent Application Number 10-2013-0156680 filed on Dec. 16, 2013, the entire contents of which application are incorporated herein for all purposes by this reference.

BACKGROUND OF INVENTION

1. Field of Invention

The present invention is a vehicle body reinforcing structure for a vehicle, and more particularly, to a vehicle body reinforcing structure which improves performance for coping with a frontal collision and a broadside collision of a vehicle by integrally connecting a lower portion of a front pillar, a side inner reinforcing member, a floor compliance, and a dash cross member.

2. Description of Related Art

In general, among elements that constitute a vehicle body of a vehicle, front pillars are structural bodies that serve to mount and support a front door, are disposed at both left and right sides in a width direction of the vehicle at a front side in a length direction of the vehicle, and serve as a column that integrally connects a front upper portion and a front lower portion of a vehicle body.

A side member, which is formed to be extended forward and rearward in the length direction of the vehicle, may be connected to a lower portion of the front pillar, and a rear end portion of a front side member, which constitutes a front vehicle body of the vehicle and is formed to be extended in the length direction of the vehicle, may be connected to the lower portion of the front pillar.

In addition, a floor compliance may be disposed at a front side in the length direction of the vehicle at the lower portion of the front pillar, and a dash panel, which separates an engine room and a passenger room, may be disposed at a front side of the front pillar.

In a case in which the vehicle having the aforementioned vehicle body structure collides with a front object or other vehicles (hereinafter, referred to as a collision body) when the vehicle travels, particularly in a case in which the vehicle does not collide with the collision body at a front side of the vehicle, but collides with the collision body in a state in which the vehicle deviates to any one side of left and right sides (this collision is called a small overlap collision), the front side member of the front vehicle body, which serves to absorb collision impact, cannot exhibit its own function, but is bent toward one side, and the collision body deviates from the front side member, and then collides with a fender apron and a wheel.

The wheel directly receives impact from the collision body, and strikes the lower portion of the front pillar that is positioned at a rear side of the wheel, such that the front pillar is excessively damaged.

In addition, because the front pillar constitutes one side portion at a front side of the interior of the vehicle, excessive damage to the front pillar threatens safety of an occupant in the interior of the vehicle.

Therefore, in order to prepare for the case in which the vehicle undergoes a frontal small overlap collision, and the front pillar receives excessive impact energy, it is necessary to increase rigidity of the lower portion of the front pillar, and properly cope with the small overlap collision of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a vehicle body reinforcing structure which securely connects a lower portion of a front pillar to a peripheral vehicle body structure such that impact energy, which is transferred to the lower portion of the front pillar through a wheel at the time of a frontal collision or a broadside collision of a vehicle, is effectively dispersed to and absorbed by other parts in a vehicle body, thereby preventing excessive damage to the front pillar, and more safely protecting an occupant.

An exemplary embodiment of the present invention provides a vehicle body reinforcing structure including: a front pillar which is formed to be extended upward and downward in a height direction of a vehicle; a side inner reinforcing member which is formed to be extended in a length direction of the vehicle; a floor compliance; a first reinforcing member which is coupled to a lower portion of the front pillar in the height direction of the vehicle, and has one end that is coupled to the side inner reinforcing member; and a second reinforcing member which is integrally coupled to the other end of the first reinforcing member, and has one end that is coupled to the floor compliance, and the other end that is coupled to the side inner reinforcing member.

The first reinforcing member may include a first reinforcing body which is formed in an arch shape, and has a "ㄷ"-shaped cross section that has a continuous structure in a length direction thereof.

The second reinforcing member may include a second reinforcing body which is formed to be extended upward and downward in the height direction of the vehicle, and has a "ㄱ"-shaped cross section that is formed by a rear surface in the length direction of the vehicle and an outer surface in a width direction of the vehicle, and has a continuous structure.

First coupling flanges may be formed at both edges of the first reinforcing body in a width direction thereof so as to be extended in the length direction of the first reinforcing body, and coupled to the lower portion of the front pillar, second coupling flanges, which are formed to be extended in length and width directions of the first reinforcing body, may be formed on a front tip portion of the first reinforcing body in the length direction of the vehicle so as to be coupled to the rear surface and the outer surface of the second reinforcing member, respectively, the side inner reinforcing member may include an upper surface in the height direction of the vehicle, and an outer surface in the width direction of the vehicle, and third coupling flanges, which are enlarged in the length and width directions of the first reinforcing body, may be formed on a rear tip portion of the first reinforcing body in the length direction of the vehicle so as to be coupled to the upper surface and the outer surface of the side inner reinforcing member, respectively.

A front door mounting boss, which mounts and supports a lower portion of a front door of the vehicle, may be formed on the first reinforcing body so as to protrude outward in the width direction of the vehicle.

A lower tip portion of the second reinforcing body in the height direction of the vehicle may be coupled to a front tip portion of the side inner reinforcing member in the length direction of the vehicle, and an upper tip portion of the second reinforcing body in the height direction of the vehicle and a front edge of the second reinforcing body in the length direction of the vehicle may be coupled to the floor compliance.

An opening may be formed at a front edge, in the length direction of the vehicle, of the lower portion of the front pillar in the height direction of the vehicle so that the first reinforcing member passes through the opening and protrudes toward a front side of the vehicle.

A dash cross member, which is formed to be extended in the width direction of the vehicle, may be integrally coupled to the outer surface of the second reinforcing member.

A dash cross member reinforcing member and the dash cross member may be integrally coupled to each other, and coupled to the outer surface of the second reinforcing member.

Widths of the dash cross member and the dash cross member reinforcing member may be identical to a width of the second reinforcing member.

The lower portion of the front pillar may be connected to the dash cross member by a third reinforcing member.

The third reinforcing member may include a third reinforcing body having a triangular box shape, and a first coupling flange, which is coupled to the lower portion of the front pillar and has approximately a "⊏" shape, and a second coupling flange, which is coupled to the dash cross member and has approximately a "⊏" shape, may be formed integrally with an edge of the third reinforcing body, respectively.

The first coupling flange may be coupled to an inner surface of a portion where the first reinforcing member is coupled to the lower portion of the front pillar.

According to the vehicle body reinforcing structure according to the exemplary embodiment of the present invention, the front edge of the lower portion of the front pillar has an opening that is opened forward in the length direction of the vehicle, one end of the arch-shaped first reinforcing member is inserted through the opening so as to be connected to the lower portion of the front pillar, the front tip portion of the arch-shaped reinforcing member is connected to the second reinforcing member having one end that is connected to a lower portion of the floor compliance, the other end of the arch-shaped first reinforcing member and the other end of the second reinforcing member are connected to the side inner reinforcing member, and the lower portion of the front pillar is connected to the dash cross member and the dash cross member reinforcing member, which are formed to be extended in the width direction of the vehicle, through the third reinforcing member, such that the lower portion of the front pillar is effectively connected to a longitudinal reinforcing structural body in the width direction of the vehicle and a lateral reinforcing structural body in the length direction of the vehicle, thereby increasing connection rigidity of the front pillar.

Accordingly, impact energy, which is transferred to the lower portion of the front pillar through a wheel at the time of a frontal collision, frontal small overlap collision, or broadside collision accident of the vehicle, is radially dispersed to and absorbed by a peripheral vehicle body structure through the floor compliance, the dash cross member, the dash panel, the side inner reinforcing member, and the like, thereby effectively preventing excessive damage to the front pillar, and impact energy is dispersed and absorbed as described above such that impact energy being transferred to a passenger room is effectively reduced, thereby more safely protecting an occupant.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
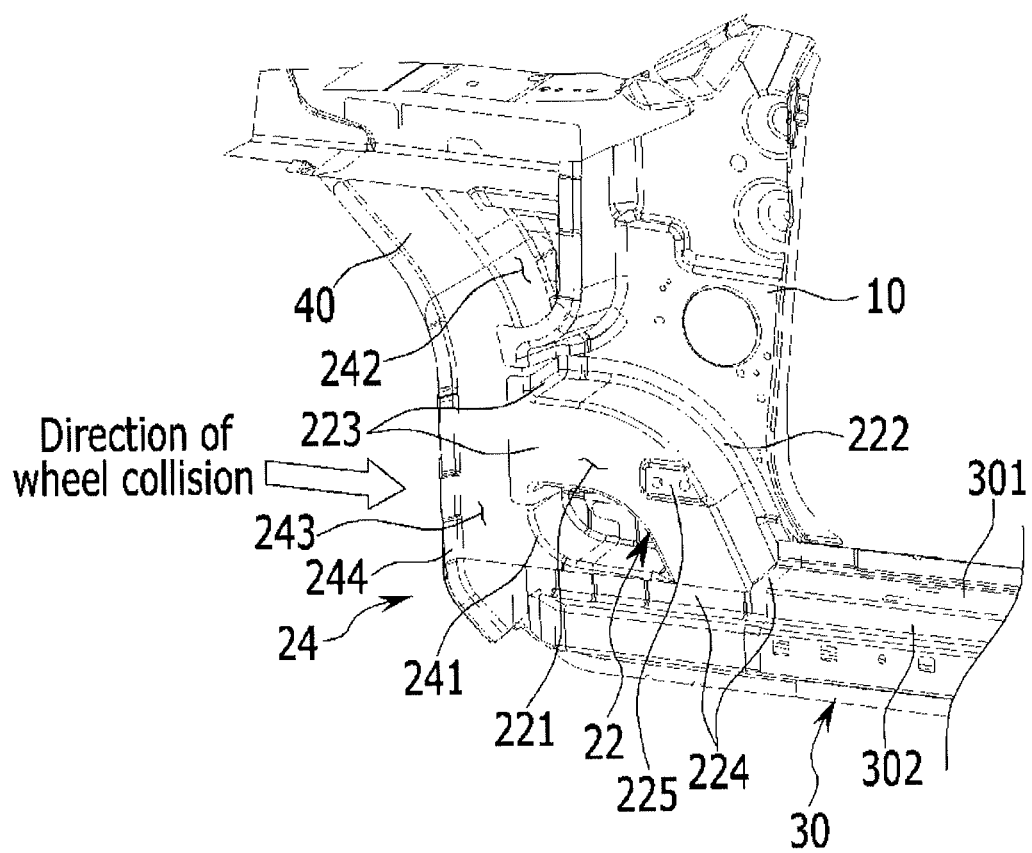
FIG. 1 is a front perspective view of an exemplary vehicle body reinforcing structure according to the present invention.
Figure 2:
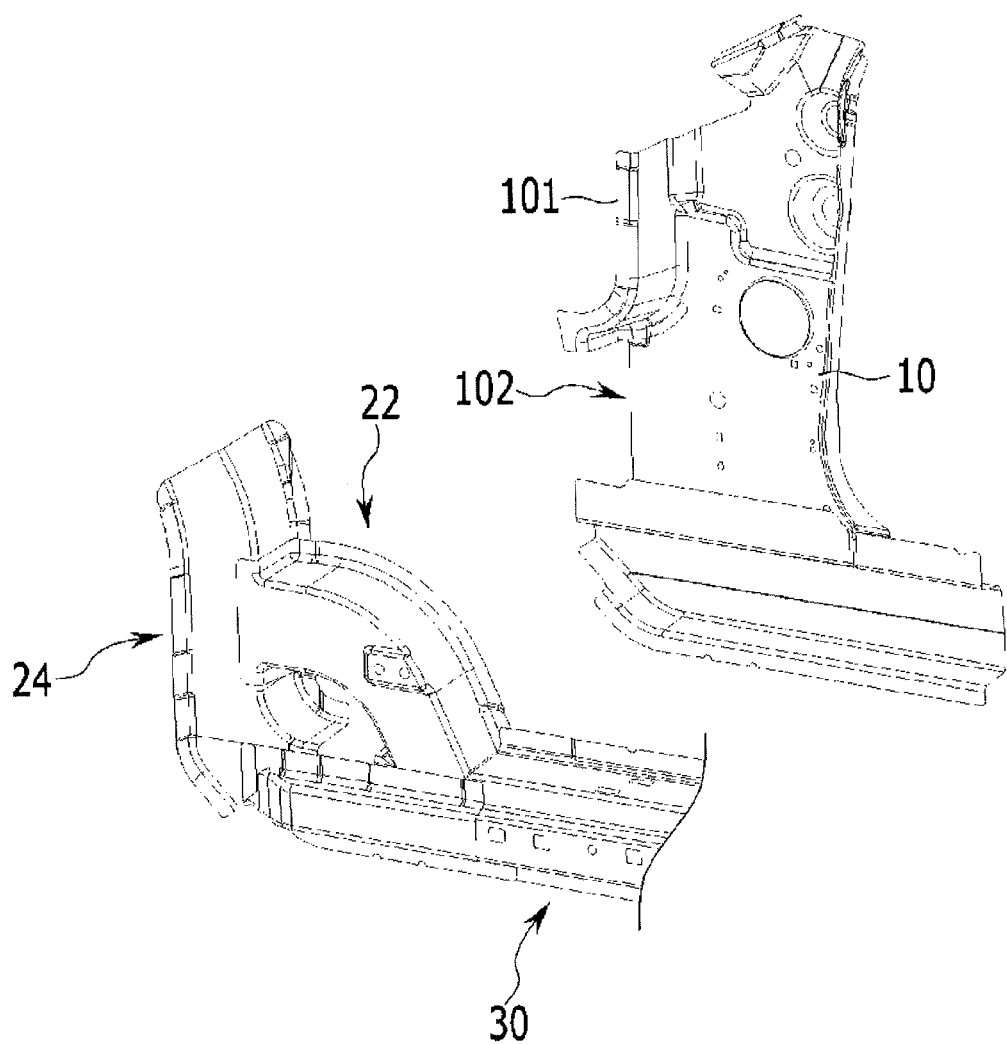
FIG. 2 is an exploded perspective view of an exemplary reinforcing structural body and a lower portion of an exemplary front pillar according to the present invention.

Referring to FIG. 1, a vehicle body reinforcing structure according to various embodiments of the present invention may include a reinforcing structural body that is coupled to a lower portion of a front pillar 10 in a height direction of a vehicle.

The reinforcing structural body may include a first reinforcing member 22 which has approximately an arch shape and is coupled to the lower portion of the front pillar 10, and a second reinforcing member 24 which is integrally coupled to a front tip portion of the first reinforcing member 22 in a length direction of the vehicle.

The first reinforcing member 22 may include a first reinforcing body 221 which has approximately an arch shape, and an approximate "⊏"-shaped cross section that has a continuous structure in a length direction thereof.

The second reinforcing member 24 may include a second reinforcing body 241 which is formed to be extended upward and downward in the height direction of the vehicle, and has an approximate " ┐ "-shaped cross section that has a continuous structure in a length direction thereof.

First coupling flanges 222 are formed at both edges of the first reinforcing body 221 in a width direction thereof so as to be extended in the length direction of the reinforcing body 221, and the first coupling flanges 222 may be coupled to the lower portion of the front pillar 10 by a welding method or the like.

Second coupling flanges 223, which are formed to be extended in the length and width directions of the first reinforcing body 221, are provided on a front tip portion of the first reinforcing body 221 in the length direction of the vehicle, such that the second coupling flanges 223 are coupled to a rear surface 242 of the second reinforcing member 24 and an outer surface 243 of the second reinforcing member 24 in a width direction of the vehicle, respectively, in a state in which the front tip portion of the first reinforcing body 221 is in close contact with the rear surface 242 of the second reinforcing member 24 in the length direction of the vehicle.

A rear tip portion of the first reinforcing body 221 in the length direction of the vehicle may be seated on and integrally coupled to an upper surface 301 of a side inner reinforcing member 30 in the direction of the vehicle which is formed to be extended in the length direction of the vehicle.

Third coupling flanges 224, which are enlarged in the length and width directions of the first reinforcing body 221, are formed on the rear tip portion of the first reinforcing body 221, and the third coupling flanges 224 may be coupled to the upper surface 301 of the side inner reinforcing member 30 and an outer surface 302 of the side inner reinforcing member 30 in the width direction of the vehicle, respectively.

A front door mounting boss 225, which may mount and support a lower portion of a front door of the vehicle, may be formed on the first reinforcing body 221 so as to protrude outward in the width direction of the vehicle.

In a case in which the lower portion of the front door of the vehicle is mounted and supported on the first reinforcing body 221, as described above, mounting rigidity of the lower portion of the front door is improved, thereby stably supporting the front door on a vehicle body.

A lower tip portion of the second reinforcing body 241 in the height direction of the vehicle may be integrally coupled to a front tip portion of the side inner reinforcing member 30 in the length direction of the vehicle.

An upper tip portion and a front edge 244 of the second reinforcing member 24 in the height direction of the vehicle may be integrally coupled to a lower portion of the floor compliance 40.

Accordingly, at the time of a frontal collision or frontal small overlap collision accident of the vehicle, when a wheel strikes the lower portion of the front pillar 10 while being pushed rearward in the length direction of the vehicle as illustrated by an arrow, impact energy, which is applied to the lower portion of the front pillar 10, is effectively dispersed to and absorbed by the floor compliance 40, which is positioned at a front side of the front pillar 10, and the side inner reinforcing member 30, which is positioned at a side of the front pillar 10, by the first reinforcing member 22 and the second reinforcing member 24.

An opening 102 is formed at a front edge 101 of the lower portion of the front pillar 10 in the length direction of the vehicle so that the first reinforcing member 22 may pass through the opening 102 and protrude forward.

Figure 3:
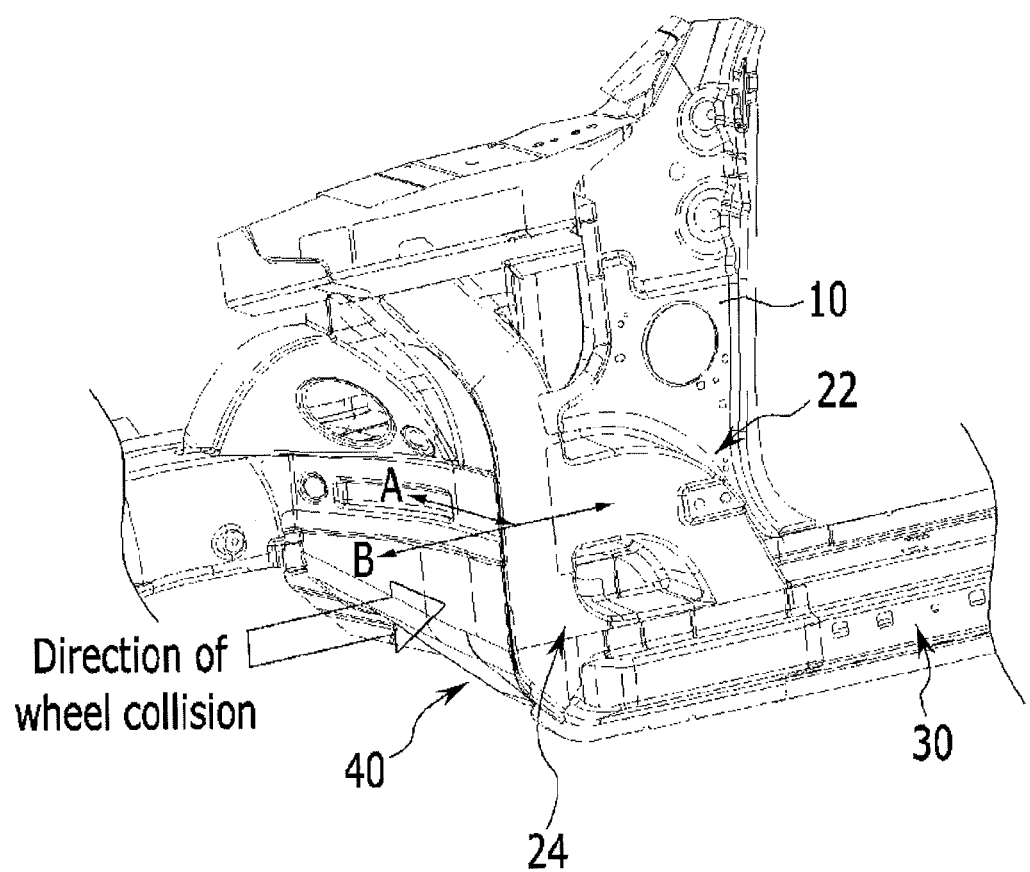
FIG. 3 is a perspective view of an exemplary vehicle body reinforcing structure according to the present invention.
Figure 4:
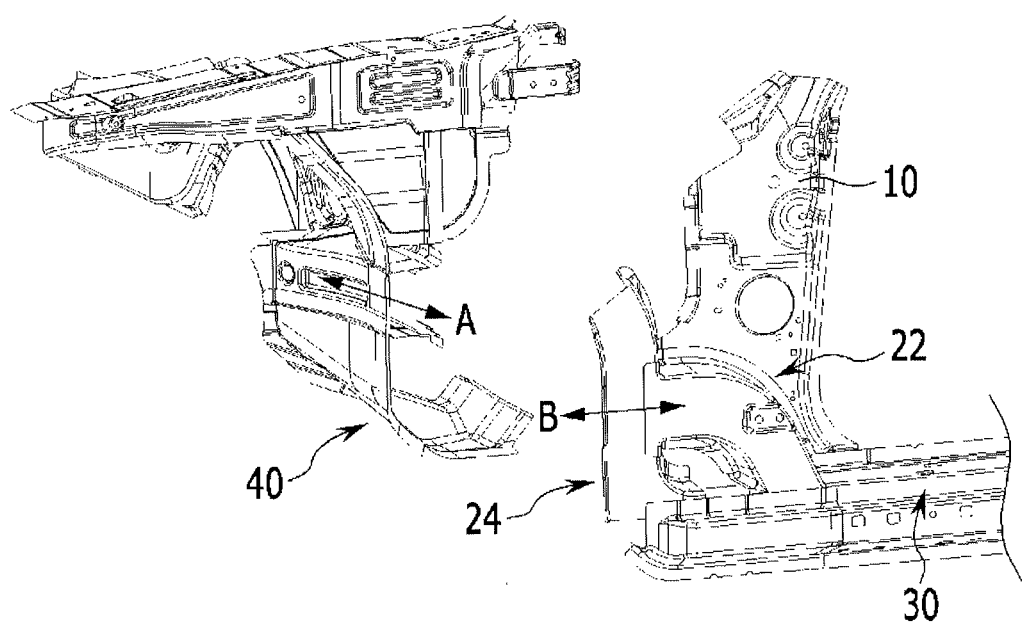
FIG. 4 is an exploded perspective view of an exemplary vehicle body reinforcing structure according to the present invention.

Referring to FIGS. 3 and 4, with respect to a direction of a wheel collision as illustrated by the arrow, a coupling structure of the side inner reinforcing member 30, the first reinforcing member 22, the second reinforcing member 24, and the lower portion of the front pillar 10 forms a longitudinal reinforcing structural body in the length direction of the vehicle, and the floor compliance 10 forms a lateral reinforcing structural body in the width direction of the vehicle, such that impact energy, which is applied through the wheel, is effectively dispersed to and absorbed by the longitudinal reinforcing structural body and the lateral reinforcing structural body in the length and width directions of the vehicle, as illustrated by arrows A and B.

Figure 5:
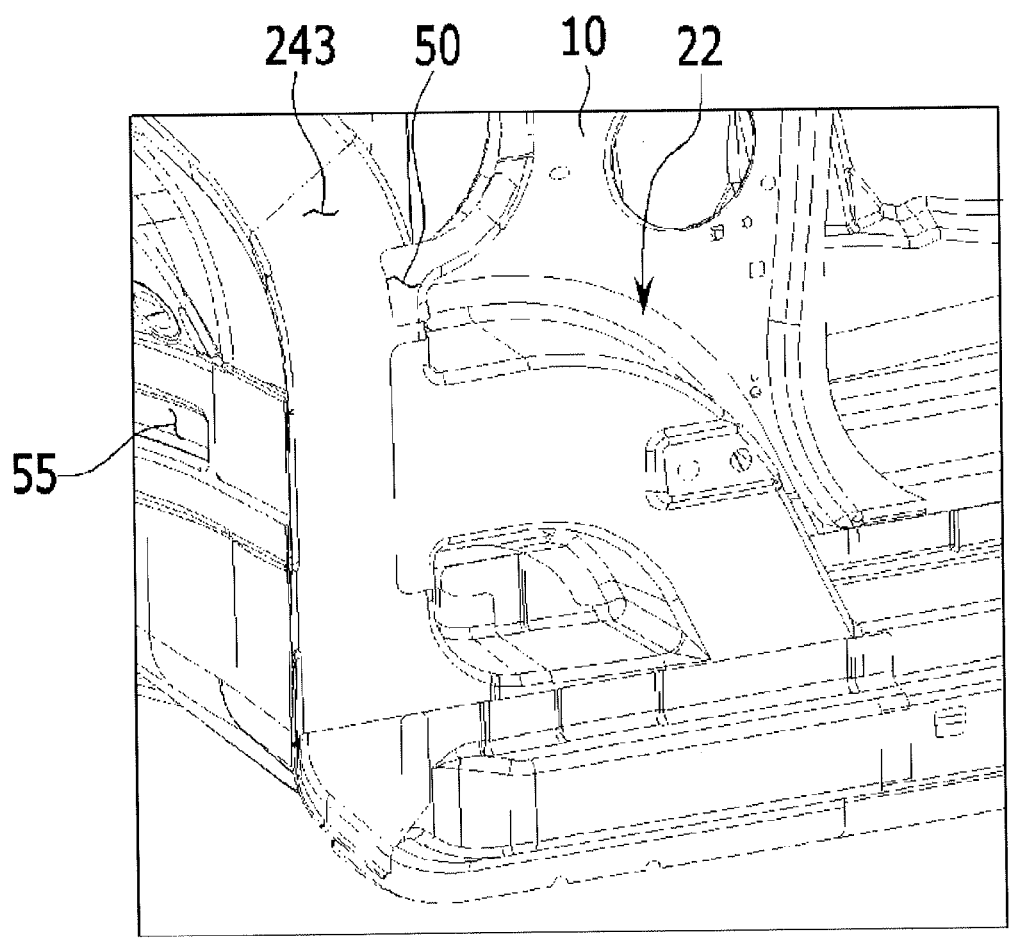
FIG. 5 is a coupled perspective view of an exemplary second reinforcing member, an exemplary dash cross member, and an exemplary dash cross member reinforcing member according to the present invention.
Figure 6:
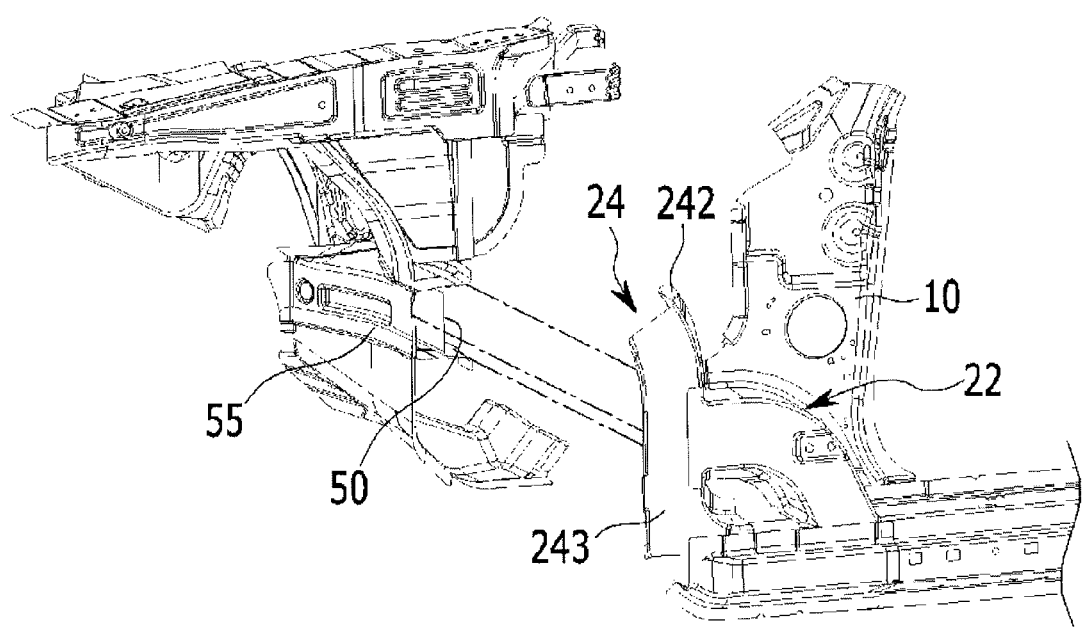
FIG. 6 is an exploded perspective view of an exemplary second reinforcing member, an exemplary dash cross member, and an exemplary dash cross member reinforcing member according to the present invention.

Referring to FIGS. 5 and 6, one end of a dash cross member 50, which is formed to be extended in the width direction of the vehicle, may be coupled to the outer surface 243 of the second reinforcing member 24.

In order to couple the dash cross member 50 to match the entire width or substantially the entire width of the outer surface 243, a dash cross member reinforcing member 55 may be coupled to the one end of the dash cross member 50. The dash cross member 50 and the dash cross member reinforcing member 55 each may have an approximate " ⊏ "-shaped cross section that has a continuous structure.

The dash cross member reinforcing member 55 may be coupled to the outer surface 243 of the second reinforcing member 24 in the width direction of the vehicle in a state in the dash cross member reinforcing member 55 is placed on and coupled to the front surface of the dash cross member 50.

That is, widths of the dash cross member reinforcing member 55 and the dash cross member 50 may be identical or substantially identical to a width of the outer surface 243 so that the dash cross member reinforcing member 55 and the dash cross member 50 are coupled over the entire width or substantially the entire width of the outer surface 243.

Accordingly, since the lateral reinforcing structural body includes the dash cross member and the dash cross member reinforcing member in addition to the floor compliance, coupling rigidity between the longitudinal reinforcing structural body and the lateral reinforcing structural body is increased.

Figure 7:
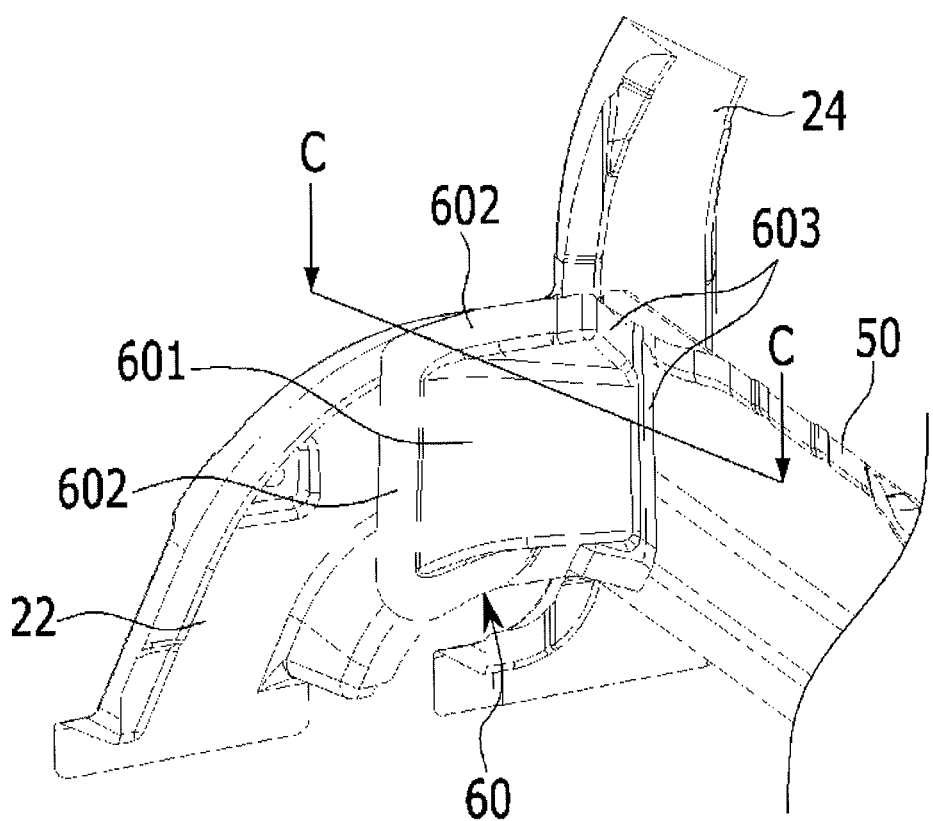
FIG. 7 is a perspective view illustrating a state in which the lower portion of exemplary front pillar and dash cross member are coupled by an exemplary third reinforcing member in accordance with the present invention.
Figure 8:
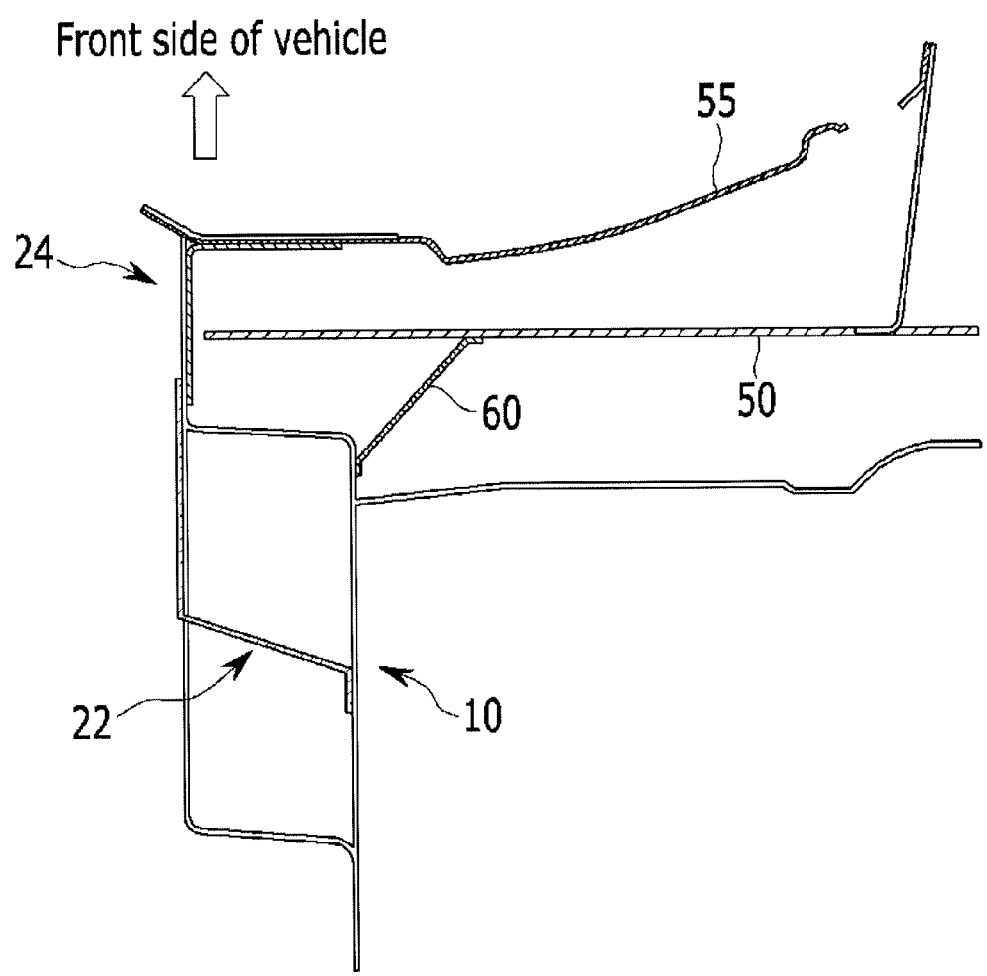
FIG. 8 is a cross-sectional view taken along line C-C of FIG. 7.

Referring to FIGS. 7 and 8, the lower portion of the front pillar 10 may be integrally coupled to the dash cross member 50 through a third reinforcing member 60. The third reinforcing member 60 may include a third reinforcing body 601 having a triangular box shape.

A first coupling flange 602, which is coupled to the lower portion of the front pillar 10 and has approximately a " ⊏ " shape, and a second coupling flange 603, which is coupled to the dash cross member 50 and has approximately a " ⊏ " shape, may be formed integrally with an edge of the third reinforcing body 60, respectively.

The first coupling flange 602 is particularly coupled to an inner surface of a portion where the first reinforcing member 22 is coupled to the lower portion of the front pillar 10, thereby increasing connection rigidity among the first reinforcing member 22, the lower portion of the front pillar 10, and the third reinforcing member 60.

Since the lower portion of the front pillar 10 is integrally connected to the dash cross member 50 through the third reinforcing member 60, as described above, lateral connection rigidity of the front pillar 10 is increased, thereby effectively dispersing and absorbing impact energy applied to the front pillar 10 in the width direction of the vehicle.

Figure 9:
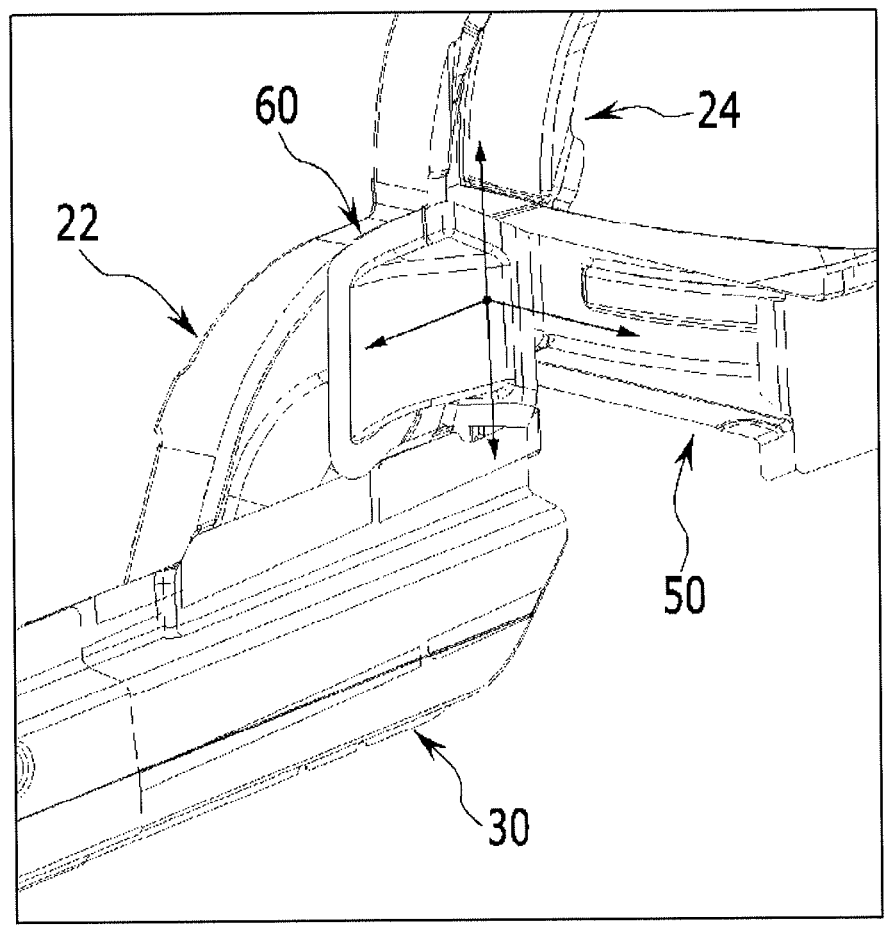
FIG. 9 is a perspective view for explaining a load distribution direction of an exemplary vehicle body reinforcing structure according to the present invention.

Referring to FIG. 9, according to various embodiments of the present invention, the first reinforcing member 22, the second reinforcing member 24, and the third reinforcing member 60 effectively connect the lower portion of the front pillar 10 to the side inner reinforcing member 30 which is extended in the length direction of the vehicle, and the dash cross member 50 which is extended in the width direction of the vehicle, so as to increase connection rigidity, such that impact energy, which is applied to the lower portion of the front pillar 10, is radially and effectively dispersed and absorbed, as illustrated by the arrows.

Figure 10:
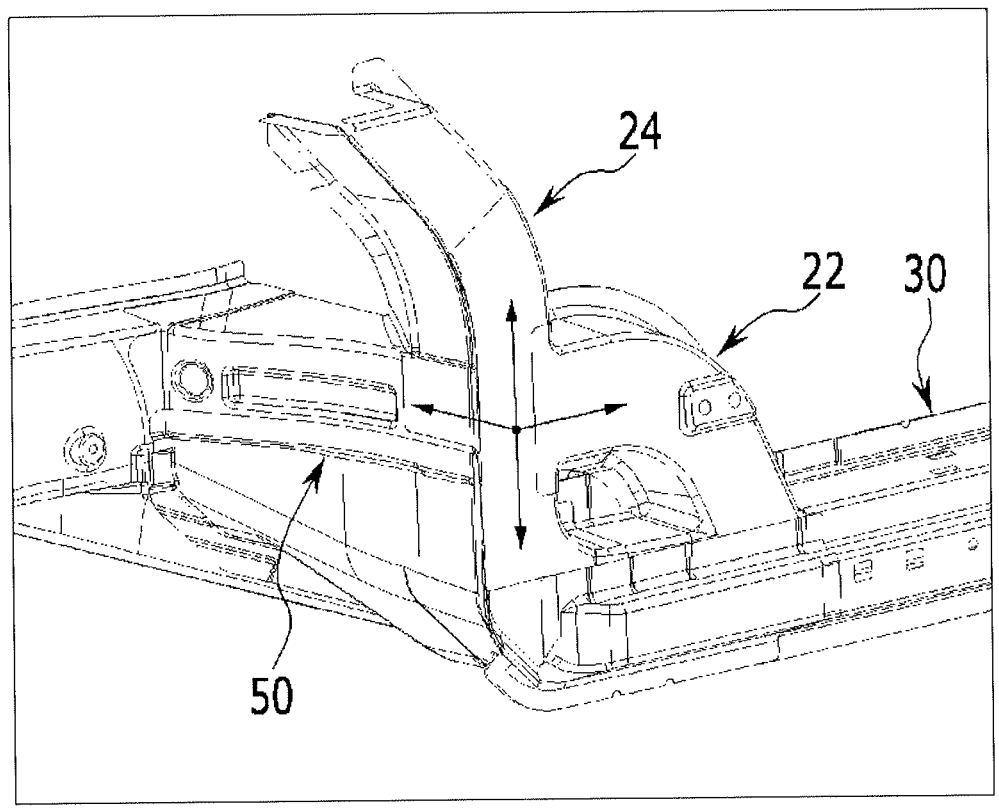
FIG. 10 is a perspective view for explaining uniform cross-section matching of an exemplary vehicle body reinforcing structure according to the present invention.

Referring to FIG. 10, the front tip portion of the first reinforcing member 22 matches the second reinforcing member 24 so as to have a uniform or substantially uniform cross section, the rear tip portion of the first reinforcing member 22 matches the side inner reinforcing member 30 so as to have a uniform or substantially uniform cross section, the dash cross member and the dash cross member reinforcing member match the outer surface of the second reinforcing member 24 so as to have a uniform or substantially uniform cross section, and the lower tip portion of the second reinforcing member 24 also matches the side inner reinforcing member 30 so as to have a uniform or substantially uniform cross section, thereby maximizing a radial load distribution effect.

In addition, according to the vehicle body reinforcing structure of the present invention, in addition to the improvement on performance for coping with a frontal collision of the vehicle, ride comfort and driving stability of the vehicle may be improved because a lower structure of the vehicle body becomes reinforced, and even at the time of a broadside collision accident of the vehicle, performance for coping with a broadside collision of the vehicle is also improved by effectively dispersing and absorbing impact energy in the width and length directions of the vehicle through the lower portion of the front pillar, the first reinforcing member, the second reinforcing member, and the third reinforcing member.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle body reinforcing structure comprising:
    a front pillar which is formed to be extended upward and downward in a height direction of a vehicle;
    a side inner reinforcing member which is formed to be extended in a length direction of the vehicle;
    a floor compliance;
    a first reinforcing member which is coupled to a lower portion of the front pillar in the height direction of the vehicle, and has one end that is coupled to the side inner reinforcing member; and
    a second reinforcing member which is integrally coupled to the other end of the first reinforcing member, and has one end that is coupled to the floor compliance, and the other end that is coupled to the side inner reinforcing member.

2. The vehicle body reinforcing structure of claim 1, wherein:
    the first reinforcing member includes a first reinforcing body which is formed in an arch shape, and has a substantially "⊏"-shaped cross section that has a continuous structure in a length direction thereof.

3. The vehicle body reinforcing structure of claim 2, wherein the second reinforcing member includes:
    a second reinforcing body which is formed to be extended upward and downward in the height direction of the vehicle, and has a substantially "⊏"-shaped cross section that is formed by a rear surface in the length direction of the vehicle and an outer surface in a width direction of the vehicle, and has a continuous structure.

4. The vehicle body reinforcing structure of claim 3, wherein:
    first coupling flanges are formed at both edges of the first reinforcing body in a width direction thereof so as to be extended in the length direction of the first reinforcing body, and coupled to the lower portion of the front pillar,
    second coupling flanges, which are formed to be extended in length and width directions of the first reinforcing body, are formed on a front tip portion of the first reinforcing body in the length direction of the vehicle so as to be coupled to the rear surface and the outer surface of the second reinforcing member, respectively,
    the side inner reinforcing member includes an upper surface in the height direction of the vehicle, and an outer surface in the width direction of the vehicle, and
    third coupling flanges, which are enlarged in the length and width directions of the first reinforcing body, are formed on a rear tip portion of the first reinforcing body in the length direction of the vehicle so as to be coupled to the upper surface and the outer surface of the side inner reinforcing member, respectively.

5. The vehicle body reinforcing structure of claim 2, wherein:
    a front door mounting boss, which mounts and supports a lower portion of a front door of the vehicle, is formed on the first reinforcing body so as to protrude outward in the width direction of the vehicle.

6. The vehicle body reinforcing structure of claim 3, wherein:
    a lower tip portion of the second reinforcing body in the height direction of the vehicle is coupled to a front tip portion of the side inner reinforcing member in the length direction of the vehicle, and
    an upper tip portion of the second reinforcing body in the height direction of the vehicle and a front edge of the second reinforcing body in the length direction of the vehicle are coupled to the floor compliance.

7. The vehicle body reinforcing structure of claim 1, wherein:
    an opening is formed at a front edge, in the length direction of the vehicle, of the lower portion of the front pillar in the height direction of the vehicle so that the first reinforcing member passes through the opening and protrudes toward a front side of the vehicle.

8. The vehicle body reinforcing structure of claim 3, wherein:
    a dash cross member, which is formed to be extended in the width direction of the vehicle, is integrally coupled to the outer surface of the second reinforcing member.

9. The vehicle body reinforcing structure of claim 8, wherein:

a dash cross member reinforcing member and the dash cross member are integrally coupled to each other, and coupled to the outer surface of the second reinforcing member.

10. The vehicle body reinforcing structure of claim 8, wherein:
widths of the dash cross member and the dash cross member reinforcing member are substantially identical to a width of the second reinforcing member.

11. The vehicle body reinforcing structure of claim 8, wherein:
the lower portion of the front pillar is connected to the dash cross member by a third reinforcing member.

12. The vehicle body reinforcing structure of claim 11, wherein:
the third reinforcing member includes a third reinforcing body having a triangular box shape, and
a first coupling flange, which is coupled to the lower portion of the front pillar and has substantially a "⊏" shape, and a second coupling flange, which is coupled to the dash cross member and has substantially a "⊏" shape, are formed integrally with an edge of the third reinforcing body, respectively.

13. The vehicle body reinforcing structure of claim 12, wherein:
the first coupling flange is coupled to an inner surface of the front pillar at a portion where the first reinforcing member is coupled to the lower portion of the front pillar.

* * * * *